(12) United States Patent
Minor et al.

(10) Patent No.: US 8,871,112 B2
(45) Date of Patent: Oct. 28, 2014

(54) COMPOSITIONS COMPRISING 2,3,3,3-TETRAFLUOROPROPENE AND HYDROCARBONS AND USES THEREOF

(75) Inventors: Barbara Haviland Minor, Elkton, MD (US); Thomas J. Leck, Hockessin, DE (US); Donald Bernard Bivens, Kennett Square, PA (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/619,037

(22) Filed: Nov. 16, 2009

(65) Prior Publication Data

US 2010/0123095 A1 May 20, 2010

Related U.S. Application Data

(60) Provisional application No. 61/116,041, filed on Nov. 19, 2008.

(51) Int. Cl.
- *C09D 5/04* (2006.01)
- *C09K 5/04* (2006.01)
- *C08J 9/14* (2006.01)
- *C09K 3/30* (2006.01)

(52) U.S. Cl.
CPC .......... C09K 5/045 (2013.01); C08J 2203/14 (2013.01); C08J 2203/142 (2013.01); C08J 9/149 (2013.01); C09K 2205/126 (2013.01); C09K 3/30 (2013.01); C09K 2205/12 (2013.01)
USPC ........................................................ 252/67

(58) Field of Classification Search
USPC ........................................................ 252/67
See application file for complete search history.

(56) References Cited

U.S. PATENT DOCUMENTS

| | | | |
|---|---|---|---|
| 3,185,734 A | 5/1965 | Fawcett et al. | |
| 6,478,979 B1 | 11/2002 | Rivers et al. | |
| 2004/0089839 A1 | 5/2004 | Thomas et al. | |
| 2004/0119047 A1 | 6/2004 | Singh et al. | |
| 2004/0256594 A1 | 12/2004 | Singh et al. | |
| 2006/0243944 A1 | 11/2006 | Minor et al. | |
| 2006/0243945 A1 | 11/2006 | Minor et al. | |
| 2007/0007488 A1* | 1/2007 | Singh et al. | 252/68 |
| 2007/0108403 A1* | 5/2007 | Sievert et al. | 252/67 |
| 2008/0230738 A1 | 9/2008 | Minor et al. | |
| 2010/0122545 A1 | 5/2010 | Minor et al. | |

FOREIGN PATENT DOCUMENTS

| | | |
|---|---|---|
| JP | 10130685 A | 5/1998 |
| JP | 2002-228307 A | 8/2002 |
| WO | 95/24451 A1 | 9/1995 |
| WO | 2005/108522 A1 | 11/2005 |
| WO | WO 2006/094303 * | 9/2006 |
| WO | 2008/009922 A2 | 1/2008 |

OTHER PUBLICATIONS

PCT International Search Report and Written Opinion, Feb. 11, 2010 for counterpart application.
Papadimitriou et al., "Physical Chemistry Chemical Physics", 2007, vol. 9, pp. 1-13.
R. D. Smith et al., Journal of American Chemical Society, vol. 84, pp. 4285-4288, 1962.
Kim, Min Soo et al., A Study to Determine the Existence of an Azeotropic R-22 "Drop-In" Substitute, NISTIR 5784, Mar. 1996.
Morrison et al., Azeotropy in refrigerant mixtures, International Journal of Refrigeration, 1993, pp. 129-138, vol. 16, No. 2.
M. S. Kim et al., "A Study to Determine the Existence of an Azeotropic R-22 'Drop-In' Substitute", NISTIR 5784, US Dept. of Commerce, Mar. 1, 1996, pp. 33-46, Figures Only.

* cited by examiner

*Primary Examiner* — John Hardee

(57) ABSTRACT

The present invention relates to compositions for use in refrigeration, air-conditioning, and heat pump systems wherein the composition comprises 2,3,3,3-tetrafluoropropene (HFC-1234yf) and at least one hydrocarbon. The compositions of the present invention are useful in processes for producing cooling or heat, as heat transfer fluids, foam blowing agents, and aerosol propellants.

5 Claims, No Drawings

COMPOSITIONS COMPRISING 2,3,3,3-TETRAFLUOROPROPENE AND HYDROCARBONS AND USES THEREOF

CROSS REFERENCE TO RELATED APPLICATIONS

This application claims the priority benefit of U.S. Provisional Patent Application No. 61/116,041, filed Nov. 19, 2008.

BACKGROUND

1. Field of the Disclosure

The present disclosure relates to compositions for use in refrigeration, air-conditioning, and heat pump systems wherein the composition comprises a tetrafluoropropene and at least one hydrocarbon. The compositions of the present invention are useful in processes for producing cooling or heat, as heat transfer fluids, foam blowing agents, aerosol propellants, and fire suppression and fire extinguishing agents.

2. Description of Related Art

The refrigeration industry has been working for the past few decades to find replacement refrigerants for the ozone depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The new HFC refrigerants, HFC-134a being the most widely used at this time, have zero ozone depletion potential and thus are not affected by the current regulatory phase out as a result of the Montreal Protocol.

Further environmental regulations may ultimately cause global phase out of certain HFC refrigerants. Currently, the automobile industry is facing regulations relating to global warming potential for refrigerants used in mobile air-conditioning. Therefore, there is a great current need to identify new refrigerants with reduced global warming potential for the mobile air-conditioning market. Should the regulations be more broadly applied in the future, for instance for stationary air conditioning and refrigeration systems, an even greater need will be felt for refrigerants that can be used in all areas of the refrigeration and air-conditioning industry.

Currently proposed replacement refrigerants for HFC-134a include HFC-152a, pure hydrocarbons such as butane or propane, or "natural" refrigerants such as $CO_2$. Many of these suggested replacements are toxic, flammable, and/or have low energy efficiency. New replacements are also being proposed for HCFC-22, R404A, R407C, R410A among others. Therefore, new alternative refrigerants are being sought.

BRIEF SUMMARY

The object of the present disclosure is to provide novel refrigerant compositions and heat transfer fluid compositions that provide unique characteristics to meet the demands of low or zero ozone depletion potential and lower global warming potential as compared to current refrigerants.

Disclosed herein are compositions comprising:
HFO-1234yf and cyclopropane;
HFO-1234yf and propylene;
HFO-1234yf, HFC-152a, and cyclopropane;
HFO-1234yf, HFC-152a, and propane; and
HFO-1234yf, HFC-134a, and cyclopropane.

Also disclosed herein are processes to produce cooling and heating and methods of replacing other refrigerants.

DETAILED DESCRIPTION

Before addressing details of embodiments described below, some terms are defined or clarified.

DEFINITIONS

As used herein, the term heat transfer composition means a composition used to carry heat from a heat source to a heat sink.

A heat source is defined as any space, location, object or body from which it is desirable to add, transfer, move or remove heat. Examples of heat sources is spaces (open or enclosed) requiring refrigeration or cooling, such as refrigerator or freezer cases in a supermarket, building spaces requiring air-conditioning, industrial water chillers or the passenger compartment of an automobile requiring air-conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A heat transfer system is the system (or apparatus) used to produce a heating or cooling effect in a particular space. A heat transfer system may be a mobile system or a stationary system.

Examples of heat transfer systems included but are not limited to air conditioners, freezers, refrigerators, heat pumps, water chillers, flooded evaporator chillers, direct expansion chillers, walk-in coolers, heat pumps, mobile refrigerators, mobile air conditioning units and combinations thereof.

As used herein, mobile heat transfer system refers to any refrigeration, air conditioner, or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "container' (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand alone devices located out of doors, such as a soft drink vending machine. These stationary applications may be stationary air conditioning and heat pumps (including but not limited to chillers, high temperature heat pumps, residential, commercial or industrial air conditioning systems, and including window, ductless, ducted, packaged terminal, chillers, and those exterior but connected to the building such as rooftop systems). In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary systems include secondary loop systems that utilize a primary refrigerant and a secondary heat transfer fluid.

Refrigeration capacity (also referred to as cooling capacity) is a term to define the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" is meant the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. By cooling a liquid below the saturation temperature, the net refrigeration capacity can be increased. Subcooling thereby improves refrigeration capacity and energy efficiency of a system. Subcool amount is the amount of cooling below the saturation temperature (in degrees) or how far below its saturation temperature a liquid composition is cooled.

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation, which may reduce heat transfer and efficiency of the system. Additionally, an azeotropic composition will not fractionate upon leakage from a refrigeration or air conditioning system.

A near-azeotropic composition (also commonly referred to as an "azeotrope-like composition") is a substantially constant boiling liquid admixture of two or more substances that behaves essentially as a single substance. One way to characterize a near-azeotropic composition is that the vapor produced by partial evaporation or distillation of the liquid has substantially the same composition as the liquid from which it was evaporated or distilled, that is, the admixture distills/refluxes without substantial composition change. Another way to characterize a near-azeotropic composition is that the bubble point vapor pressure and the dew point vapor pressure of the composition at a particular temperature are substantially the same. Herein, a composition is near-azeotropic if, after 50 weight percent of the composition is removed, such as by evaporation or boiling off, the difference in vapor pressure between the original composition and the composition remaining after 50 weight percent of the original composition has been removed is less than about 10 percent.

A non-azeotropic composition is a mixture of two or more substances that behaves as a simple mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of':

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

Disclosed are compositions comprising 2,3,3,3-tetrafluoropropene (HFO-1234yf) and at least one other compound. HFO-1234yf may be made by methods known in the art.

In one embodiment, in the compositions of the present invention comprising HFO-1234yf the other compound comprises at least one hydrocarbon. In another embodiment, in the compositions of the present invention comprising HFO-1234yf the other compound comprises at least one hydrocarbon selected from the group consisting of propane, cyclopropane and propylene.

In another embodiment the disclosed compositions also contain other fluorinated compounds selected from the group consisting of tetrafluoroethane, pentafluoroethane (HFC-125), and difluoroethane (1,1-difluoroethane or HFC-152a). Tetrafluoroethane may be 1,1,1,2-tetrafluoroethane (HFC-134a) or 1,1,2,2-tetrafluoroethane (HFC-134). These fluorinated compounds are commercially available or may be made by methods known in the art.

In one embodiment, compositions are disclosed comprising:
HFO-1234yf and cyclopropane;
HFO-1234yf and propylene;
HFO-1234yf, HFC-152a, and cyclopropane;
HFO-1234yf, HFC-152a, and propane; and
HFO-1234yf, HFC-134a, and cyclopropane.

The compositions disclosed herein are useful as heat transfer compositions, aerosol propellant, foaming agents, blowing agents, carrier fluids, displacement drying agents, buffing abrasion agents, polymerization media, expansion agents for polyolefins and polyurethane, and gaseous dielectrics. In liquid or gaseous form, and the disclosed compositions act as a working fluid used to carry heat from a heat source to a heat sink. Such heat transfer compositions may also be useful as a refrigerant in a cycle wherein the fluid undergoes phase changes; that is, from a liquid to a gas and back or vice versa.

In one embodiment the disclosed binary compositions may be generally useful when the HFO-1234yf is present at about 1 weight percent to about 99 weight percent. In another embodiment, the useful compositions comprise about 20 weight percent to about 99 weight percent HFO-1234yf. In another embodiment, the useful compositions comprise about 40 weight percent to about 98 weight percent HFO-1234yf. And in yet another embodiment, the useful compositions comprise about 50 weight percent to about 98 weight percent HFO-1234yf.

In one embodiment, the disclosed ternary compositions containing HFO-1234yf, hydrocarbon and an additional fluorocarbon may be generally useful when the HFO-1234yf is present at about 1 weight percent to about 98 weight percent of the overall composition. In another embodiment, the useful compositions comprise about 20 weight percent to about 98 weight percent tetrafluoropropene. In another embodiment, the useful compositions comprise about 40 weight percent to about 98 weight percent tetrafluoropropene. And in yet another embodiment, the useful compositions comprise about 50 weight percent to about 98 weight percent tetrafluoropropene.

In one embodiment, the disclosed compositions are generally expected to maintain the desired properties and functionality when the components are present in the concentrations as listed +/−2 weight percent.

In some embodiments, the disclosed compositions are found to be near-azeotropic. Near-azeotropic compositions comprising 2,3,3,3-tetrafluoropropene have been identified at the specified temperature as listed in Table 1.

TABLE 1

| Components | Near-azeotrope range (weight percent) | Temp (° C.) |
| --- | --- | --- |
| HFO-1234yf/cyclopropane | 1-99/99-1 | 25 |
| HFO-1234yf/propylene | 1-86/99-14 and 95-99/5-1 | 25 |
| HFO-1234yf/HFC-152a/cyclopropane | 1-98/1-98/1-98 | 25 |
| HFO-1234yf/HFC-152a/propane | 1-98/1-98/20-98 | 0 |
| HFO-1234yf/HFC-134a/cyclopropane | 1-98/1-98/1-98 | 25 |

In some embodiments, the disclosed compositions are found to be azeotropic. Azeotropic compositions comprising 2,3,3,3-tetrafluoropropene have been identified at the specified temperature as listed in Table 2.

TABLE 2

| Composition (A/B/C) | Concentration, wt % | | | Temp, °C | Pressure, psia (Kpa) |
|---|---|---|---|---|---|
| | A | B | C | | |
| HFO-1234yf/cyclopropane | 65.4 | 34.6 | | 25 | 123.8 |
| HFO-1234yf/propylene | 23.9 | 76.1 | | 25 | 167.7 |
| HFO-1234yf/152a/cyclopropane | 52.6 | 11.1 | 36.3 | 25 | 124.4 |
| HFC-1234yf/152a/propane | 18.2 | 27.5 | 54.3 | 0 | 76.0 |

Certain of the compositions of the present invention are non-azeotropic compositions.

A non-azeotropic composition may have certain advantages over azeotropic or near azeotropic mixtures. A non-azeotropic composition is a mixture of two or more substances that behaves as a mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

In some embodiments, in addition to the HFO-1234yf, hydrocarbons, and optional additional fluorinated compounds, the disclosed compositions may comprise optional other components.

In some embodiments, the optional other components (also referred to herein as additives) in the compositions disclosed herein may comprise one or more components selected from the group consisting of lubricants, dyes, solubilizing agents, compatibilizers, stabilizers, tracers, perfluoropolyethers, anti wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional other components fit into one or more of these categories and may have qualities that lend themselves to achieve one or more performance characteristic.

In some embodiments, one or more additive is present in the compositions disclosed in small amounts relative to the overall composition. In some embodiments, the amount of additive(s) concentration in the disclosed compositions is from less than about 0.1 weight percent to as much as about 5 weight percent of total additive. In some the additives are present in the disclosed compositions in an amount between about 0.1 weight percent to about 3.5 weight percent. The additive component(s) selected for the disclosed composition is selected on the basis of the utility and/or individual equipment components or the system requirements.

In some embodiments, the disclosed compositions include at least one lubricant selected from the group consisting of mineral oils (oils of mineral origin), synthetic lubricants, and mixtures thereof.

In some embodiments, the disclosed compositions include at least one lubricant selected from those suitable for use with refrigeration or air-conditioning equipment. In some embodiments, the disclosed compositions include at least one synthetic oil selected from those readily known in the field of compression refrigeration lubrication.

In some embodiments, at least one optional component is a mineral oil lubricant. In some embodiments, the mineral oil lubricant is selected from the group consisting of paraffins (including straight carbon chain saturated hydrocarbons, branched carbon chain saturated hydrocarbons, and mixtures thereof), naphthenes (including saturated cyclic and ring structures), aromatics (those with unsaturated hydrocarbons containing one or more ring, wherein one or more ring is characterized by alternating carbon-carbon double bonds) and non-hydrocarbons (those molecules containing atoms such as sulfur, nitrogen, oxygen and mixtures thereof), and mixtures and combinations of thereof.

Some embodiments may contain one or more synthetic lubricant. In some embodiments, the synthetic lubricant is selected from the group consisting of alkyl substituted aromatics (such as benzene or naphthalene substituted with linear, branched, or mixtures of linear and branched alkyl groups, often generically referred to as alkylbenzenes), synthetic paraffins and naphthenes, poly (alpha olefins), polyglycols (including polyalkyene glycols), dibasic acid esters, polyesters, neopentyl esters, polyvinyl ethers (PVEs), silicones, silicate esters, fluorinated compounds, phosphate esters and mixtures and combinations thereof.

In some embodiments, the compositions as disclosed herein further comprise at least one lubricant selected from the group consisting of mineral oils, alkylbenzenes, polyalphaolefins, polyalkylene glycols, polyol esters, polyvinyl ethers, and mixtures thereof.

In some embodiments, the compositions disclosed herein contain at least one commercially available lubricant. In some embodiments the compositions disclosed herein contain at least one lubricant selected from the group consisting of BVM 100 N (paraffinic mineral oil sold by BVA Oils), Suniso® 1GS, Suniso® 3GS and Suniso® 5GS (naphthenic mineral oils sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals) and HAB 22 (branched alkylbenzene sold by Nippon Oil), polyol esters (POEs) such as Castrol® 100 (Castrol, United Kingdom), polyalkylene glycols (PAGs) such as RL-488A from Dow (Dow Chemical, Midland, Mich.), and mixtures thereof.

In some embodiments, the lubricant is present in an amount of less than 5.0 weight % to the total composition. In other embodiments, the amount of lubricant is between about 0.1 and 3.5 weight % of the total composition.

Notwithstanding the above weight ratios for compositions disclosed herein, it is understood that in some heat transfer systems, while the composition is being used, it may acquire additional lubricant from one or more equipment component of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

In such heat transfer systems, even when the majority of the lubricant resides within the compressor portion of the system, the entire system may contain a total composition with as much as about 75 weight percent to as little as about 1.0 weight percent of the composition being lubricant. In one embodiment, in some systems, for example supermarket refrigerated display cases, the system may contain about 3 weight percent lubricant (over and above any lubricant present in the refrigerant composition prior to charging the system) and 97 weight percent refrigerant. In another embodiment, in some systems, for example mobile air conditioning systems, the system may contain about 20 weight percent lubricant (over and above any lubricant present in the refrigerant composition prior to charging the system) and about 80 weight percent refrigerant.

In some embodiments, the disclosed compositions may include additives to reduce the flammability characteristics of the composition. Hydrocarbon refrigerants are known to be flammable compounds and in some applications, the reduction of the flammability characteristics is desired. Additives that may be included in the disclosed compositions include, salts (e.g. acetates, borates, carbonates, bicarbonates, phosphates, nitrates, hydroxides, oxides, molybdates, bromides, bromates, chlorates, chlorides, or iodides), phosphorous compounds including phosphate esters, organic phosphonates, and phosphonium salts, boric acid, organic boron compounds, brominated compounds, chlorinated paraffins, ammonium polyphosphates, melamines, mixtures of water with polyalkylene glycols or polyol esters, perfluorinated lubricants, fluoroketones, fluoroiodo compounds, or mixtures thereof.

Representative salts for reducing flammability include but are not limited to: sodium acetate ($CH_3CO_2Na$), potassium acetate ($CH_3CO_2K$), potassium carbonate ($K_2CO_3$), iron (II) carbonate ($FeCO_3$), sodium carbonate ($Na_2CO_3$), ammonium carbonate (($NH_4)_2CO_3$), sodium bicarbonate ($NaHCO_3$), potassium bicarbonate, ($KHCO_3$), ammonium phosphate (($NH_4)_3PO_4$), potassium nitrate ($KNO_3$), sodium chloride (NaCl), potassium chloride (KCl), cobalt chloride ($CoCl_2$), rubidium chloride (RbCl), titanium chloride ($TiCl_4$), sodium bromide (NaBr), potassium bromide (KBr), rubidium bromide (RbBr), potassium iodide (KI), rubidium iodide (RbI), magnesium hydroxide ($Mg(OH)_2$), aluminum hydroxide ($Al(OH)_3$), zinc borate ($3ZnO:2B_2O_3$), zinc oxide (ZnO), zinc molybdate ($ZnMoO_4$), calcium molybdate ($CaMoO_4$), copper oxides, ($Cu_2O$ and CuO), and antimony oxides, including but not limited to antimony trioxide ($Sb_2O_3$) and antimony pentoxide ($Sb_2O_5$), and others. Such salts are available from many chemical suppliers such as Aldrich, Milwaukee, Wis.

In some embodiments, the compositions as disclosed herein may further comprise phosphorus compounds for reducing flammability including but not limited to phosphate esters, including but not limited to: trialkyl phosphates, triaryl phosphates, mixed alkyl-aryl phosphates (alkyldiaryl, dialkylaryl or alkylated aryl), and cyclic phosphates. Representative trialkyl phosphates include: trimethyl phosphate (($CH_3)_3PO_4$); triethyl phosphate (($CH_3CH_2)_3PO_4$); tributyl phosphate (($C_4H_9)_3PO_4$); trioctyl phosphate (($C_8H_{17})_3PO_4$); and tri(2-ethylhexyl)phosphate (($CH_3CH(C_2H_5)(CH_2)_4)_3PO_4$). Representative triaryl phosphates include: triphenyl phosphate (($C_6H_5O)_3PO$); tricresyl phosphate (TCP, ($CH_3C_6H_4O)_3PO$); and trixylenyl phosphate ((($CH_3)_2O_6H_3O)_3PO$). Representative mixed alkyl-aryl phosphates include: isopropylphenyl phenyl phosphate (IPPP, ($C_6H_5O)_2(($CH_3)_2CHO)PO$) and bis(t-butylphenyl)phenyl phosphate (TBPP, ($C_6H_5O)_2(($CH_3)_3C)PO$). Such phosphorus compounds are available from multiple chemical suppliers such as Aldrich (Milwaukee, Wis.); Alfa Aesar (Ward Hill, Mass.); or Akzo Nobel (Arnhem, the Netherlands). Additional representative phosphorus compounds are Syn-O-Ad 8784, a butylated triphenyl phosphate from Akzo Nobel (Arnhem, the Netherlands); Durad 620, a tert-butylated triphenyl phosphate from Great Lakes Chemical Corporation (GLCC, West Lafayette, Ind.); and Durad 220 and 110, iso-propylated triphenyl phosphates also from GLCC.

In some embodiments, the disclosed compositions may further organic phosphonates and phosphonium salts for reducing flammability including but not limited to: tris monochloropropyl phosphate (TMCPP, different isomers, tris(2-chloroisopropyl)phosphate, and tris(2-chloropropyl) phosphate); tris(1,3-dichloro-2-propyl)phosphate (TDCPP, $P(OCH_2OH)_4Cl$); dimethyl phosphonate ($PHO(OCH_3)_2$); and tetrakis(hydroxymethyl)phosphonium chloride ($P(CH_2OH)_4Cl$) among others. These phosphorus compounds are also available from Aldrich, Alfa Aesar, or Akzo Nobel.

In some embodiments, the disclosed compositions may further comprise boron compounds such as boric acid ($H_3BO_3$), triphenyl borane ($B(C_6H_5)_3$) and other boron salts, such as sodium borate.

In some embodiments, the disclosed compositions may further comprise brominated organic compounds such as hexabromocyclododecane or decabromodiphenyl oxide. The brominated organic compounds further include aliphatic compounds such as dibromoneopentyl glycol (DBNPG, $C(CH_2Br)_2(CH_2OH)_2$, Specialchem FR-522); trisbromoneopentyl phosphate (Specialchem FR-370/FR-372, $(C(CH_2Br)_3 CH_2O)PO$), trisbromoneopentyl alcohol (TB-NPA, $CH_2(CH_2Br)OH$), and hexabromocyclododecane (HBCD, cyclo-(—$CHBrCHBrCH_2CH_2CHBrCHBrCH_2CH_2$ $CHBrCHBrCH_2CH_2$—)).

The brominated organic compounds further include aromatic compounds such as decabromodiphenyl oxide (DECA, $O(C_6Br_5)_2$, Specialchem FR-1210); tris(tribromophenyl)triazine (Specialchem FR-245); tetrabromobisphenol A bis(2, 3-dibromopropyl ether) (Specialchem FR-720); Octabromodiphenyl oxide (OCTA, Specialchem FR-1208); tetrabromobisphenol A ($(CH_3)_2C(C_6H_2Br_2OH)_2$, Specialchem FR-1524); and brominated trimethylphenyl indan (Specialchem FR-1808).

The brominated organic compounds that function as flammability reducing additives in the compositions as disclosed herein include brominated epoxy compounds such as Specialchem F-2016 (oligomer), among others. All of the aliphatic brominated, aromatic brominated and brominated epoxy compounds listed above are available from Specialchem S. A. (Paris, France).

In some embodiments, the compositions as disclosed herein may further comprise chlorinated paraffins with 10-30 carbon atoms and having from about 35 weight percent to about 70 weight percent chlorine in the molecule. Chlorinated paraffins include those sold under the trademarks: Chlorez®/ Hordaresin® flame retardant additives; Doversperse® dispersions and emulsions of resinous and liquid chlorinated paraffins; Doverguard® brominated chlorinated paraffins; Paroil®; and Chlorowax® liquid chlorinated paraffins; by Dover Chemical Corporation (Dover, Ohio). Additionally, chlorinated paraffins of the present invention include compounds sold under the trademarks: Cereclor® 42, 42SS, 48, 70, LCCP 44, and 46 fire retardant chlorinated paraffin waxes and Cereclor® S-45, 51L, S-52, S-52HV, S-55, S-56, S-56B, and MCCP 54 $C_{14}$-$C_{17}$ chlorinated paraffins, by Pioneer (Houston, Tex.).

In some embodiments, the compositions as disclosed herein may further comprise ammonium polyphosphates (APPS), $[NH_4PO_3]_n$ as flammability reducing additives. The ammonium polyphosphates may be straight chained or branched and cross-linked molecules. Ammonium polyphosphates are available coated with silanes, melamines or other substances. The present invention is intended to include coated or uncoated ammonium polyphosphate formulations. Representative of these APP formulations are FR CROS 484 (uncoated), RF CROS 486 (surface reacted silane coating), and FR CROS 484 (surface reacted melamine coating), which are all available from Specialchem S. A. (Paris, France).

In some embodiment, the compositions as disclosed herein may further comprise mixtures of water with polyalkylene glycols (PAGs) or polyol ester (POEs) lubricants optionally with anti corrosion, antiwear, stabilizer and/or lubricity additives, as flammability reducing additives. The formulations with water may comprise 30 weight percent water or more, such as those sold under the trademark EMKAROX® HV 45 and EMKAROX® HV 20 (PAGs) bu Uniqema, Gouda, The Netherlands. As the PAG/water and POE/water as described may also function as a lubricant, additional lubricants may not be necessary. Alternatively, additional lubricants may be added to the PAG/water or POE/water mixtures as may be required for lubrication.

In some embodiments, the compositions as disclosed herein may further comprise perfluorocarbon or perfluoropolyether lubricants as flammability reducing additives. Examples include but are not limited to perfluoropolyethers sold under the trademarks: Krytox® (DuPont, Wilmington, Del.); Fomblin® (Solvay Solexis, Italy); and Demnum™ (offered by Daikin America, Inc., Osaka, Japan). Representative lubricants of this type are Krytox® 1531XP or Krytox® GLP series, Fomblin® Z-Dol, Z-Tetraol, AM 2001, or AM 3001, Demnum™ LR-200 or S-65 and other Demnum™ oils. As said perfluorinated lubricants may also function as a lubricant, no other lubricant may be required in a composition containing said perfluorinated fire hazard-reducing agents. Alternatively, the perfluorinated lubricants may be included as an additive to the other lubricants as described herein.

In some embodiments, the compositions as disclosed herein may further comprise melamines as flammability reducing additives. Such melamines include melamine (2,4, 6-triamino-1,3,5-triazine) and homologues and derivatives of melamine. Such melamine homologues include multi-ring structures such as melam (1,3,5-triazine-2,4,6-triamine-n-(4, 6-diamino-1,3,5-triazine-2-yl), melem (2,5,8-triamino-1,3,4, 6,7,9,9b-heptaazaphenalene), and melon (poly[8-amino-1,3, 4,6,7,9,9b-heptaazaphenalene-2,5-diyl)]). Such melamine derivatives include melamine cyanurate and melamine (mono/pyro/poly) phosphates, such as those melamines sold under the trademark Melapur® MP (melamine monophosphate and Melapur® 200 (a melamine polyphosphate) by Specialchem S. A. (Paris, France).

In some embodiments, the compositions disclosed herein may further comprise fluoroketones as flammability reducing additives, wherein said fluoroketones are represented by the formula $R^1COR^2$, wherein $R^1$ and $R^2$ are independently selected from straight or branched chain, saturated or unsaturated, aliphatic or alicyclic partially or fully fluorinated hydrocarbon radicals. Additionally, $R^1$ and $R^2$ may be joined to form a cyclic fluoroketone ring. The fluoroketones may contain from about 2 to 10 carbon atoms. Preferred fluoroketones contain 4 to 8 carbon atoms. The fluoroketones of the present invention may further contain heteroatoms, such as oxygen, thus forming additional ketone groups, ether groups, aldehyde groups, or ester groups. Examples of such fluoroketones are 1,1,1,2,2,4,5,5,5-nonafluoro-4-(trifluoromethyl)-3-pentanone or perfluoroethyl isopropyl ketone (PEIK); 1,1,1, 3,4,4,4-heptafluoro-3-(trifluoromethyl)-2-butanone or perfluoromethyl isopropyl ketone (PMIK); 1,1,1,2,4,5,5,5-octafluoro-2,4-bis(trifluoromethyl)-3-pentanone; 1,1,1,2,4, 4,5,5-octafluoro-2-(trifluoromethyl)-3-pentanone; 1,1,1,2,4, 4,5,5,6,6,6-undecafluoro-2-(trifluoromethyl)-3-hexanone; and 1,1,2,2,4,5,5,5-octafluoro-1-(trifluoromethoxy)-4-(trifluoromethyl)-3-pentanone. PEIK is available from 3M™ (St. Paul, Minn.) and the other fluoroketones listed may be prepared as described in U.S. Pat. Nos. 3,185,734 and 6,478,979 incorporated herein by reference, and J. Am. Chem. Soc., vol 84, pp. 4285-88, 1962.

In some embodiments, the compositions as disclosed herein may further comprise fluoroiodo compounds such as trifluoromethyl iodide ($CF_3I$), as flammability reducing additives.

The concentration of the flammability reducing additives will vary depending upon the flammability characteristics of the composition to which these additives will be added. The concentration of the flammability reducing additives in any of the disclosed compositions may be sufficient to reduce flammability to an acceptable level or eliminate the flammability of said composition entirely. In one embodiment, the concentration of flammability reducing additive with respect to the disclosed compositions may be from about greater than zero weight percent to about 50 weight percent based on the total composition. In another embodiment the concentration of flammability reducing additive will be from about 0.1 weight percent to about 20 weight percent. In yet another embodiment, the concentration of the flammability reducing additive will be from about 0.1 weight percent to about 5 weight percent based on the total composition.

In some embodiments, the disclosed compositions include at least one dye. In some embodiments, the disclosed compositions include at least one ultra-violet (UV) dye.

In some embodiments, the disclosed compositions include at least one UV dye that is a fluorescent dye. In some embodiments, the described compositions include at least one UV dye that is a fluorescent dye selected from the group consisting of naphthalimides, perylenes, coumarins, anthracenes, phenanthracenes, xanthenes, thioxanthenes, naphthoxanthenes, fluoresceins, and derivatives of said dye and combinations thereof.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

In some embodiments, the UV dye is a useful component for detecting leaks of the composition by permitting one to observe the fluorescence of the dye at or in the vicinity of a leak point in an apparatus (e.g., refrigeration unit, air-conditioner or heat pump). One may observe the UV emission, e.g., fluorescence from the dye under an ultra-violet light. Therefore, if a composition containing such a UV dye is leaking from a given point in an apparatus, the fluorescence can be detected at the leak point, or in the vicinity of the leak point.

In some embodiments, the described compositions further contain at least one solubilizing agent selected to improve the solubility of one or more dye in the disclosed compositions. In some embodiments, the weight ratio of dye to solubilizing agent ranges from about 99:1 to about 1:1.

In some embodiments, solubilizing agents in the disclosed compositions include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof.

In some embodiments, at least one compatibilizer is selected to improve the compatibility of one or more lubricant with the disclosed compositions. In some embodiments, the compatibilizer is selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof.

In some embodiments, one or more solubilizing agent and/or compatibilizer is selected from the group consisting of hydrocarbon ethers consisting of the ethers containing only carbon, hydrogen and oxygen, such as dimethyl ether (DME) and mixtures thereof.

In some embodiments, the disclosed composition includes at least one linear or cyclic aliphatic or aromatic hydrocarbon compatibilizer containing from 5 to 15 carbon atoms. In some embodiments, the compatibilizer is selected from the group consisting of at least one hydrocarbon; in other embodiments, the compatibilizer is a hydrocarbon selected from the group consisting of at least pentane, hexane, octane, nonane, decane, commercially available from Exxon Chemical (USA) under the trademarks Isopar® H (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140 and mixtures thereof.

In some embodiments, the disclosed compositions include at least one polymeric compatibilizer. In some embodiments, the disclosed compositions include at least one a polymeric compatibilizer selected from those that are random copolymers of fluorinated and non-fluorinated acrylates, wherein the polymer comprises repeating units of at least one monomer represented by the formulae $CH_2$=$C(R^1)CO_2R^2$, $CH_2$=$C(R^3)C_6H_4R^4$, and $CH_2$=$C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours & Co. (Wilmington, Del., 19898, USA) under the trademark Zonyl® PHS. Zonyl® PHS is a random copolymer made by polymerizing 40 weight percent $CH_2$=$C(CH_3)CO_2CH_2CH_2$ $(CF_2CF_2)_mF$ (also referred to as Zonyl® fluoromethacrylate or ZFM) wherein m is from 1 to 12, primarily 2 to 8, and 60 weight percent lauryl methacrylate $(CH_2$=$C(CH_3)CO_2$ $(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

In some embodiments, the disclosed compositions further include metal surface deactivators. In some embodiments, at least one metal surface deactivator is selected from the group consisting of areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In some embodiments, the compositions disclosed herein further include at least one stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof.

In some embodiments, said at least one stabilizer is selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl) phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad®620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis (trifluoromethyl)oxirane; 3-ethyl-3-hydroxymethyl-oxetane, such as OXT-101 (Toagosei Co., Ltd); 3-ethyl-3-((phenoxy) methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

In some embodiments, the disclosed composition includes at least one ionic liquid stabilizer selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]—$, $[PF_6]—$, $[SbF_6]—$, $[CF_3SO_3]—$, $[HCF_2CF_2SO_3]—$, $[CF_3HFCCF_2SO_3]—$, $[HCClFCF_2SO_3]—$, $[(CF_3SO_2)_2N]—$, $[(CF_3CF_2SO_2)_2N]—$, $[(CF_3SO_2)_3C]—$, $[CF_3CO_2]—$, and F— and mixtures thereof. In some embodiments, e ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, at least one stabilizer is a hindered phenol, which are any substituted phenol compound including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thio-bis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tert-butylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl)sulfide and mixtures and combinations thereof.

In some embodiments, the disclosed compositions contain at least one tracer. In some embodiments, the tracer additive in the disclosed compositions consists of two or more tracer compounds from the same class of compounds or from different classes of compounds.

In some embodiments, the tracer component or tracer blend is present in the compositions at a total concentration of about 50 parts per million by weight (ppm) to about 1000 ppm. In other embodiments, the tracer compound or tracer blend is present at a total concentration of about 50 ppm to about 500 ppm. In other embodiment, the tracer compound or tracer blend is present at a total concentration of about 100 ppm to about 300 ppm.

In some embodiments, the disclosed compositions include at least one tracer selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Some embodiments of the disclosed compositions include at least one tracer selected from the group consisting of fluoroethane, 1,1,-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodinetrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer additive is a tracer blend containing two or more hydrofluorocarbons, or one hydrofluorocarbon in combination with one or more perfluorocarbons.

In some embodiments, at least one tracer composition is added to the disclosed compositions in previously determined quantities to allow detection of any dilution, contamination or other alteration of the composition.

In other embodiments, the compositions disclosed herein may further include a perfluoropolyether. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". In some embodiments, the perfluoropolyether has the formula of $CF_3$—$(CF_2)_2$—O—$[CF(CF_3)$—$CF_2$—O] j'-R' f, and is commercially available from DuPont under the trademark Krytox®. In the immediately preceding formula, j' is 2-100, inclusive and R' f is $CF_2CF_3$, a C3 to C6 perfluoroalkyl group, or combinations thereof.

Other PFPEs, commercially available from Ausimont of Milan, Italy, and Montedison S.p.A., of Milan, Italy, under the trademarks Fomblin® and Galden®, respectively, and produced by perfluoroolefin photooxidation, can also be used.

PFPE commercially available under the trademark Fomblin®-Y can have the formula of $CF_3O(CF_2CF(CF_3)$—O—$)_m(CF_2$—O—$)_n$—$R_{1f}$. Also suitable is $CF_3O[CF_2CF(CF_3)O]_m(CF_2CF_2O)_o(CF_2O)_n$—$R_{1f}$. In the formulae $R_{1f}$ is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of $CF_3O(CF_2CF_2$—O—$)_{p'}(CF_2$—O$)_{q'}CF_3$ where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F—$[(CF_2)_3$—O$]_{t'}$—$R_{2f}$ where $R_{2f}$ is $CF_3$, $C_2F_5$, or combinations thereof and t' is 2-200, inclusive.

In some embodiments, the PFPE is unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be O—(CF(CF$_3$)CF$_2$—O)$_{w'}$, O—(CF$_2$O)$_{x'}$, (CF$_2$CF$_2$—O)$_{y'}$, O—(C$_2$F$_4$—O)$_{w'}$, O—(C$_2$F$_4$—O)$_{x'}$(C$_3$F$_6$—O)$_{y'}$, O—(CF(CF$_3$)CF$_2$—O)$_{x'}$(CF$_2$—O)$_{y'}$, O—(CF$_2$CF$_2$CF$_2$—O)$_{w'}$, O—(CF(CF$_3$)CF$_2$—O)$_{x'}$(CF$_2$CF$_2$—O)$_{y'}$—(CF$_2$—O)$_{z}$, or combinations of two or more thereof; preferably A is O—(CF(CF$_3$)CF$_2$—O)$_{w'}$, O—(C$_2$F$_4$—O)$^{w'}$, O—(C$_2$F$_4$—O)$_{x'}$(C$_3$F$_6$—O)$_{y'}$,O—(CF$_2$CF$_2$CF$_2$—O)$_{w'}$, or combinations of two or more thereof; w' is 4 to 100; x' and y' are each independently 1 to 100. Specific examples include, but are not limited to, F(CF(CF$_3$)—CF$_2$—O)$_9$—CF$_2$CF$_3$, F(CF(CF$_3$)—CF$_2$—O)$_9$—CF(CF$_3$)$_2$, and combinations thereof. In such PFPEs, up to 30% of the halogen atoms can be halogens other than fluorine, such as, for example, chlorine atoms.

In other embodiments, the two end groups of the perfluoropolyether, independently, may be functionalized by the same or different groups. A functionalized PFPE is a PFPE wherein at least one of the two end groups of the perfluoropolyether has at least one of its halogen atoms substituted by a group selected from esters, hydroxyls, amines, amides, cyanos, carboxylic acids, sulfonic acids or combinations thereof.

In some embodiments, representative ester end groups include —COOCH$_3$, —COOCH$_2$CH$_3$, CF$_2$COOCH$_3$, —CF$_2$COOCH$_2$CH$_3$, —CF$_2$CF$_2$COOCH$_3$, —CF$_2$CF$_2$COOCH$_2$CH$_3$, —CF$_2$CH$_2$COOCH$_3$, —CF$_2$CF$_2$CH$_2$COOCH$_3$, —CF$_2$CH$_2$CH$_2$COOCH$_3$, —CF$_2$CF$_2$CH$_2$CH$_2$COOCH$_3$.

In some embodiments, representative hydroxyl end groups include —CF$_2$OH, —CF$_2$CF$_2$OH, —CF$_2$CH$_2$OH, —CF$_2$CF$_2$CH$_2$OH, —CF$_2$CH$_2$CH$_2$OH, —CF$_2$CF$_2$CH$_2$CH$_2$OH.

In some embodiments, representative amine end groups include —CF$_2$NR$^1$R$^2$, —CF$_2$CF$_2$NR$^1$R$^2$, —CF$_2$CH$_2$NR$^1$R$^2$, —CF$_2$CF$_2$CH$_2$NR$^1$R$^2$, —CF$_2$CH$_2$CH$_2$NR$^1$R$^2$, —CF$_2$CF$_2$CH$_2$CH$_2$NR$^1$R$^2$, wherein R$^1$ and R$^2$ are independently H, CH$_3$, or CH$_2$CH$_3$.

In some embodiments, representative amide end groups include —CF$_2$C(O)NR$^1$R$^2$, —CF$_2$CF$_2$C(O)NR$^1$R$^2$, —CF$_2$CH$_2$C(O)NR$^1$R$^2$, —CF$_2$CF$_2$CH$_2$C(O)NR$^1$R$^2$, —CF$_2$CH$_2$CH$_2$C(O)NR$^1$R$^2$, —CF$_2$CF$_2$CH$_2$CH$_2$C(O)NR$^1$R$^2$, wherein R$^1$ and R$^2$ are independently H, CH$_3$, or CH$_2$CH$_3$.

In some embodiments, representative cyano end groups include —CF$_2$CN, —CF$_2$CF$_2$CN, —CF$_2$CH$_2$CN, —CF$_2$CF$_2$CH$_2$CN, —CF$_2$CH$_2$CH$_2$CN, —CF$_2$CF$_2$CH$_2$CH$_2$CN.

In some embodiments, representative carboxylic acid end groups include —CF$_2$COOH, —CF$_2$CF$_2$COOH, —CF$_2$CH$_2$COOH, —CF$_2$CF$_2$CH$_2$COOH, —CF$_2$CH$_2$CH$_2$COOH, —CF$_2$CF$_2$CH$_2$CH$_2$COOH.

In some embodiments, the sulfonic acid end groups is selected from the group consisting of —S(O)(O)OR$^3$, —S(O)(O)R$^4$, —CF$_2$OS(O)(O)OR$^3$, —CF$_2$CF$_2$OS(O)(O)OR$^3$, —CF$_2$CH$_2$OS(O)(O)OR$^3$, —CF$_2$CF$_2$CH$_2$OS(O)(O)OR$^3$, —CF$_2$CH$_2$CH$_2$OS(O)(O)OR$^3$, —CF$_2$CF$_2$CH$_2$CH$_2$OS(O)(O)OR$^3$, —CF$_2$S(O)(O)OR$^3$, —CF$_2$CF$_2$S(O)(O)OR$^3$, —CF$_2$CH$_2$S(O)(O)OR$^3$, —CF$_2$CF$_2$CH$_2$S(O)(O)OR$^3$, —CF$_2$CH$_2$CH$_2$S(O)(O)OR$^3$, —CF$_2$CF$_2$CH$_2$CH$_2$S(O)(O)OR$^3$, —CF$_2$OS(O)(O)R$^4$, —CF$_2$CF$_2$OS(O)(O)R$^4$, —CF$_2$CH$_2$OS(O)(O)R$^4$, —CF$_2$CF$_2$CH$_2$OS(O)(O)R$^4$, —CF$_2$CH$_2$CH$_2$OS(O)(O)R$^4$, —CF$_2$CF$_2$CH$_2$CH$_2$OS(O)(O)R$^4$, wherein R$^3$ is H, CH$_3$, CH$_2$CH$_3$, CH$_2$CF$_3$, CF$_3$, or CF$_2$CF$_3$, R$^4$ is CH$_3$, CH$_2$CH$_3$, CH$_2$CF$_3$, CF$_3$, or CF$_2$CF$_3$.

In some embodiments, the disclosed compositions include additives that are members of the triaryl phosphate family of EP (extreme pressure) lubricity additives, such as butylated triphenyl phosphates (BTPP), or other alkylated triaryl phosphate esters, e.g. Syn-0-Ad® 8478 from Akzo Chemicals, tricresyl phosphates and related compounds. Additionally, the metal dialkyl dithiophosphates (e.g., zinc dialkyl dithiophosphate (or ZDDP), including the commercially available Lubrizol 1375 and other members of this family of chemicals is used in compositions of the disclosed compositions. Other antiwear additives include natural product oils and asymmetrical polyhydroxyl lubrication additives, such as the commercially available Synergol TMS (International Lubricants).

In some embodiments, stabilizers such as antioxidants, free radical scavengers, and water scavengers and mixtures thereof are included. Such additives in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

In another embodiment, the compositions disclosed herein may be prepared by a method comprising (i) reclaiming a volume of one or more components of a refrigerant composition from at least one refrigerant container, (ii) removing impurities sufficiently to enable reuse of said one or more of the reclaimed components, (iii) and optionally, combining all or part of said reclaimed volume of components with at least one additional refrigerant composition or component.

A refrigerant container may be any container in which is stored a refrigerant blend composition that has been used in a refrigeration apparatus, air-conditioning apparatus or heat pump apparatus. Said refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be any component that is in the refrigerant blend or refrigerant blend component due to its use in a refrigeration apparatus, air-conditioning apparatus or heat pump apparatus. Such impurities include but are not limited to refrigeration lubricants, being those described earlier herein, particulates including but not limited to metal, metal salt or elastomer particles, that may have come out of the refrigeration apparatus, air-conditioning apparatus or heat pump apparatus, and any other contaminants that may adversely effect the performance of the refrigerant blend composition.

Such impurities may be removed sufficiently to allow reuse of the refrigerant blend or refrigerant blend component without adversely effecting the performance or equipment within which the refrigerant blend or refrigerant blend component will be used.

It may be necessary to provide additional refrigerant blend or refrigerant blend component to the residual refrigerant blend or refrigerant blend component in order to produce a composition that meets the specifications required for a given product. For instance, if a refrigerant blend has 3 components in a particular weight percentage range, it may be necessary to add one or more of the components in a given amount in order to restore the composition to within the specification limits.

Compositions of the present invention have zero ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 500, less than 150, less than 100, or less than 50.

Methods of Use

The compositions disclosed herein may be useful as low global warming potential (GWP) replacements for currently used refrigerants, including but not limited to R134a (or HFC-134a, 1,1,1,2-tetrafluoroethane), R22 (or HCFC-22, chlorodifluoromethane), R12 (CFC-12, dichlorodifluoromethane); R407C (ASHRAE designation for a blend of 52 weight percent R134a, 25 weight percent R125 (pentafluoroethane), and 23 weight percent R32 (difluoromethane)); R410A (ASHRAE designation for a blend of 50 weight percent R125 and 50 weight percent R32); R417A (ASHRAE designation for a blend of 46.6 weight percent R125, 50.0 weight percent R134a, and 3.4 weight percent n-butane); R419A (ASHRAE designation for a blend containing R125, R134a and DME); R422A, R422B, R422C and R422D (ASHRAE designation for blends of R125, R134a, isobutane in differing component concentrations); R404A (ASHRAE designation for a blend of 44 weight percent R125, 52 weight percent R143a (1,1,1-trifluoroethane), and 4.0 weight percent R134a); R413A (ASHRAE designation for a blend containing R218, R134a, and isobutane); R423A (ASHRAE designation for a blend containing 52.5 weight percent R134a and 47.5 weight percent R227ea (1,1,1,2,3,3,3-heptafluoropropane)); R424A (ASHRAE designation for a blend containing R125, R134a, isobutane, n-butane, and isopentane); R426A (ASHRAE designation for a blend containing R125, R134a, n-butane, and isopentane); R428A (ASHRAE designation for a blend containing R125, R143a, propane and isobutane); R430A (ASHRAE designation for a blend containing R152a and isobutane); R434A (ASHRAE designation for a blend containing about 63.2 weight percent R125, about 16 weight percent R134a, about 18 weight percent R143a, and about 2.8 weight percent isobutane); R437A (ASHRAE designation for a blend containing about 19.5 weight percent R125, about 78.5 weight percent R134a, about 1.4 weight percent n-butane, and about 0.6 weight percent n-pentane); R438A (ASHRAE designation for a blend containing about 8.5 weight percent R32, about 45 weight percent R125, about 44.2 weight percent R134a, about 1.7 weight percent n-butane, and about 0.6 weight percent isopentane); and R507A (ASHRAE designation for a blend of 50 weight percent R125 and 50 weight percent R143a). Additionally, the compositions disclosed herein may be useful as replacements for R12 (CFC-12, dichlorodifluoromethane) or R502 (ASHRAE designation for a blend of 51.2 weight percent CFC-115 (chloropentafluoroethane) and 48.8 weight percent HCFC-22).

Often replacement refrigerants are most useful if capable of being used in the original refrigeration equipment designed for a different refrigerant. In particular, the compositions as disclosed herein may be useful as replacements for R12, R134a, R407C, R417A, and R422D, among others in original equipment. Additionally, the compositions as disclosed herein may be useful as replacements for R410A, R507, R404A, 502, and R422A, among others, in equipment designed for these refrigerants with some system modifications. Further, the compositions as disclosed herein may be useful for replacing any of the above mentioned refrigerants in equipment specifically modified for or produced entirely for these new compositions In many applications, some embodiments of the disclosed compositions are useful as refrigerants and provide at least comparable cooling performance (meaning cooling capacity and energy efficiency) as the refrigerant for which a replacement is being sought.

In some embodiments, the use of the above disclosed compositions includes using the composition as heat transfer compositions in processes to produce heat comprising condensing a composition as disclosed herein in the vicinity of a body to be heated and thereafter evaporating said composition.

Also disclosed herein is the use of the above disclosed compositions as heat transfer compositions in processes to produce cooling comprising condensing a composition as disclosed herein and thereafter evaporating said composition in the vicinity of a body to be cooled.

In some embodiments, the use of the above disclosed compositions includes using the composition as heat transfer compositions in processes for producing cooling, wherein the composition is first cooled and stored under pressure and when exposed to a warmer environment, the composition absorbs some of the ambient heat, expands, and the warmer environment is thusly cooled.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the herein disclosed compositions to the heat transfer system. In another embodiment, a heat exchange system comprising a composition disclosed herein is provided, wherein said system is selected from the group consisting of air conditioners, freezers, refrigerators, heat pumps, water chillers, flooded evaporator chillers, direct expansion chillers, walk-in coolers, heat pumps, mobile refrigerators, mobile air conditioning units, and systems having combinations thereof. Additionally, the compositions as disclosed herein may be useful in secondary loop systems wherein these compositions serve as the primary refrigerant thus providing cooling to a secondary heat transfer fluid that thereby cools a remote location.

In another embodiment is provided a method for replacing a high GWP refrigerant in a refrigeration, air-conditioning, or heat pump apparatus, wherein said high GWP refrigerant is selected from the group consisting of R134a, R22, R12, R404A, R410A, R407C, R413A, R417A, R422A, R422B, R422C and R422D, R423A, R507A, R502, and R437A, said method comprising providing a composition as disclosed herein to said refrigeration, air-conditioning, or heat pump apparatus that uses, used or is designed to use said high GWP refrigerant; wherein said composition is selected from the group consisting of:

HFO-1234yf and cyclopropane;
HFO-1234yf and propylene;
HFO-1234yf, HFC-152a, and cyclopropane;
HFO-1234yf, HFC-152a, and propane; and
HFO-1234yf, HFC-134a, and cyclopropane.

In another embodiment, the method for replacing a high GWP refrigerant may further comprise providing a composition to said refrigeration, air-conditioning, or heat pump apparatus that uses, used or is designed to use said high GWP refrigerant, wherein the composition is selected from the group consisting of:

HFO-1234yf and cyclopropane;
HFO-1234yf and propylene;
HFO-1234yf, HFC-152a, and cyclopropane;
HFO-1234yf, HFC-152a, and propane; and
HFO-1234yf, HFC-134a, and cyclopropane.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In one embodiment, there is provided a heat transfer system containing a composition as disclosed herein. In another embodiment is disclosed a refrigeration, air-conditioning or heat pump apparatus containing a composition as disclosed herein. In another embodiment, is disclosed a stationary refrigeration or air-conditioning apparatus containing a composition as disclosed herein. In yet another embodiment is disclosed a mobile refrigeration or air conditioning apparatus containing a composition as disclosed herein.

In another embodiment, a method is provided for producing cooling comprising evaporating any of the disclosed compositions in the vicinity of a body to be cooled, and thereafter condensing said composition.

In another embodiment, a method is provided for producing heat comprising condensing any of the compositions as discloses herein in the vicinity of a body to be heated, and thereafter evaporating said compositions.

In another embodiment, disclosed is a method of using the composition of the present invention as a heat transfer fluid composition. The method comprises transporting said composition from a heat source to a heat sink.

In another embodiment, the present invention relates to foam expansion agent compositions comprising the fluoroolefin-containing compositions of the present invention as described herein for use in preparing foams. In other embodiments the invention provides foamable compositions, and preferably polyurethane and polyisocyanate foam compositions, and method of preparing foams. In such foam embodiments, one or more of the present fluoroolefin-containing compositions are included as a foam expansion agent in foamable compositions, which composition preferably includes one or more additional components capable of reacting and foaming under the proper conditions to form a foam or cellular structure.

The present invention further relates to a method of forming a foam comprising: (a) adding to a foamable composition a fluoroolefin-containing composition of the present invention; and (b) reacting the foamable composition under conditions effective to form a foam.

Another embodiment of the present invention relates to the use of the fluoroolefin-containing compositions as described herein for use as propellants in sprayable compositions. Additionally, the present invention relates to a sprayable composition comprising the fluoroolefin-containing compositions as described herein. The active ingredient to be sprayed together with inert ingredients, solvents and other materials may also be present in a sprayable composition. Preferably, the sprayable composition is an aerosol. Suitable active materials to be sprayed include, without limitations, cosmetic materials, such as deodorants, perfumes, hair sprays, cleaners, and polishing agents as well as medicinal materials such as anti-asthma and anti-halitosis medications.

The present invention further relates to a process for producing aerosol products comprising the step of adding a fluoroolefin-containing composition as described herein to active ingredients in an aerosol container, wherein said composition functions as a propellant.

EXAMPLES

The concepts disclosed herein will be further described in the following examples, which do not limit the scope of the invention described in the claims.

Example 1

Impact of Vapor Leakage

A vessel is charged with an initial composition at the indicated temperature, and the initial vapor pressure of the composition is measured. The composition is allowed to leak from the vessel, while the temperature is held constant, until 50 weight percent of the initial composition is removed, at which time the vapor pressure of the composition remaining in the vessel is measured. Estimates are shown in Table 3.

TABLE 3

| Composition wt % | Initial P (Psia) | Initial P (kPa) | After 50% Leak (Psia) | After 50% Leak (kPa) | Delta P (%) |
|---|---|---|---|---|---|
| HFO-1234yf/cyclopropane (at 25° C.) | | | | | |
| 65.4/34.6 | 123.8 | 853.6 | 123.8 | 853.6 | 0.0% |
| 80/20 | 121.8 | 839.8 | 120.4 | 830.1 | 1.1% |
| 90/10 | 115.6 | 797.0 | 111.9 | 771.5 | 3.2% |
| 99/1 | 101.0 | 696.4 | 99.7 | 687.4 | 1.3% |
| 50/50 | 122.5 | 844.6 | 121.6 | 838.4 | 0.7% |
| 30/70 | 117.9 | 812.9 | 114.6 | 790.1 | 2.8% |
| 10/90 | 110.2 | 759.8 | 107.5 | 741.2 | 2.5% |
| 1/99 | 105.6 | 728.1 | 105.2 | 725.3 | 0.4% |
| HFO-1234yf/propylene (at 25° C.) | | | | | |
| 23.9/76.1 | 167.7 | 1156.3 | 167.7 | 1156.3 | 0.0% |
| 10/90 | 167.1 | 1152.1 | 167.0 | 1151.4 | 0.1% |
| 1/99 | 166.1 | 1145.2 | 166.1 | 1145.2 | 0.0% |
| 40/60 | 166.8 | 1150.1 | 166.4 | 1147.3 | 0.2% |
| 60/40 | 161.9 | 1116.3 | 158.7 | 1094.2 | 2.0% |
| 80/20 | 147.8 | 1019.1 | 136.6 | 941.8 | 7.6% |
| 85/15 | 141.0 | 972.2 | 127.4 | 878.4 | 9.6% |
| 86/14 | 139.3 | 960.4 | 125.4 | 864.6 | 10.0% |
| 87/13 | 137.6 | 948.7 | 123.4 | 850.8 | 10.3% |
| 95/5 | 118.1 | 814.3 | 106.7 | 735.7 | 9.7% |
| 97/3 | 111.2 | 766.7 | 103.0 | 710.2 | 7.4% |
| 99/1 | 103.0 | 710.2 | 99.8 | 688.1 | 3.1% |
| HFO-1234yf/HFC-152a/cyclopropane (at 25° C.) | | | | | |
| 52.6/11.1/36.3 | 124.4 | 857.7 | 124.4 | 857.9 | 0.0% |
| 98/1/1 | 101.2 | 697.8 | 99.9 | 688.8 | 1.3% |
| 1/98/1 | 88.0 | 606.7 | 86.7 | 597.8 | 1.5% |
| 1/1/98 | 106.5 | 734.3 | 105.6 | 728.1 | 0.8% |
| 80/10/10 | 116.0 | 799.8 | 112.5 | 775.7 | 3.0% |
| 10/80/10 | 104.2 | 718.4 | 97.4 | 671.6 | 6.5% |
| 10/10/80 | 116.3 | 801.9 | 112.7 | 777.0 | 3.1% |

TABLE 3-continued

| Composition wt % | Initial P (Psia) | Initial P (kPa) | After 50% Leak (Psia) | After 50% Leak (kPa) | Delta P (%) |
|---|---|---|---|---|---|
| 60/20/20 | 121.6 | 838.4 | 119.9 | 826.7 | 1.4% |
| 20/60/20 | 115.3 | 795.0 | 110.7 | 763.3 | 4.0% |
| 20/20/60 | 121.8 | 839.8 | 120.7 | 832.2 | 0.9% |
| 40/30/30 | 122.9 | 847.4 | 122.1 | 841.9 | 0.7% |
| 30/40/30 | 121.5 | 837.7 | 120.2 | 828.8 | 1.1% |
| 30/30/40 | 123.3 | 850.1 | 123.2 | 849.4 | 0.1% |
| 10/40/50 | 121.6 | 838.4 | 121.4 | 837.0 | 0.2% |
| 50/40/10 | 112.8 | 777.7 | 108.3 | 746.7 | 4.0% |
| 5/90/5 | 96.1 | 662.6 | 91.0 | 627.4 | 5.3% |
| 80/17/3 | 106.4 | 733.6 | 103.8 | 715.7 | 2.4% |
| 60/37/3 | 104.5 | 720.5 | 101.6 | 700.5 | 2.8% |
| 15/70/15 | 110.5 | 761.9 | 104.2 | 718.4 | 5.7% |
| HFO-1234yf/HFC-152a/propane (at zero ° C.) | | | | | |
| 18.2/27.5/54.3 | 76.0 | 524.0 | 76.0 | 524.0 | 0.0% |
| 98/1/1 | 48.3 | 333.0 | 46.0 | 317.2 | 4.8% |
| 1/98/1 | 46.4 | 319.9 | 38.7 | 266.8 | 16.6% |
| 1/1/98 | 69.4 | 478.5 | 69.1 | 476.4 | 0.4% |
| 70/15/15 | 68.5 | 472.3 | 61.0 | 420.6 | 10.9% |
| 70/5/25 | 72.5 | 499.9 | 69.4 | 478.5 | 4.3% |
| 80/5/15 | 68.1 | 469.5 | 61.0 | 420.6 | 10.4% |
| 50/25/25 | 72.9 | 502.6 | 69.5 | 479.2 | 4.7% |
| 40/40/20 | 71.2 | 490.9 | 64.6 | 445.4 | 9.3% |
| 60/20/60 | 71.2 | 490.9 | 65.9 | 454.4 | 7.4% |
| 40/20/40 | 75.4 | 519.9 | 74.9 | 516.4 | 0.7% |
| 30/10/60 | 75.6 | 521.2 | 75.4 | 519.9 | 0.3% |
| 15/5/80 | 73.4 | 506.1 | 72.4 | 499.2 | 1.4% |
| 5/5/90 | 71.6 | 493.7 | 70.6 | 486.8 | 1.4% |
| HFO-1234yf/134a/cyclopropane (at 25° C.) | | | | | |
| 98/1/1 | 101.4 | 699.1 | 100.0 | 689.5 | 1.4% |
| 80/10/10 | 118.7 | 818.4 | 114.7 | 790.8 | 3.4% |
| 70/15/15 | 123.9 | 854.3 | 121.1 | 835.0 | 2.3% |
| 60/20/20 | 127.4 | 878.4 | 125.8 | 867.4 | 1.3% |
| 40/30/30 | 131.8 | 908.7 | 131.2 | 904.6 | 0.5% |
| 20/40/40 | 134.3 | 926.0 | 133.4 | 919.8 | 0.7% |
| 10/45/45 | 135.1 | 931.5 | 133.7 | 921.8 | 1.0% |
| 1/49/50 | 135.7 | 935.6 | 133.4 | 919.8 | 1.7% |
| 10/85/5 | 117.3 | 808.8 | 107.7 | 742.6 | 8.2% |
| 5/90/5 | 117.2 | 808.1 | 107.0 | 737.7 | 8.7% |
| 1/98/1 | 103.3 | 712.2 | 99.6 | 686.7 | 3.6% |
| 1/1/98 | 106.8 | 736.4 | 105.4 | 726.7 | 1.3% |
| 5/5/90 | 113.2 | 780.5 | 107.5 | 741.2 | 5.0% |
| 10/10/80 | 119.6 | 824.6 | 111.3 | 767.4 | 6.9% |
| 20/20/60 | 128.2 | 883.9 | 122.6 | 845.3 | 4.4% |
| 80/17/3 | 109.7 | 756.4 | 106.3 | 732.9 | 3.1% |
| 20/60/20 | 133.2 | 918.4 | 131.0 | 903.2 | 1.7% |

Table 3 indicates which compositions are near azeotropic as those compositions wherein the difference in vapor pressure between the original composition and the composition remaining after 50 weight percent is removed is less than about 10 percent.

Example 2

Cycle Performance

Table 4 shows the cooling performance of various refrigerant compositions as disclosed herein as compared to HFC-134a, HCFC-22, R407C, and HFO-1234yf. In the table, Evap Pres is evaporator pressure, Cond Pres is condenser pressure, Comp Exit T is compressor exit temperature, COP is coefficient of performance (analogous to energy efficiency), and Cap is cooling capacity. The data are based on the following conditions:

| | |
|---|---|
| Condenser Temperature | 54° C. |
| Evaporator Temperature | 4° C. |
| Subcool Temperature | 4° C. |
| Return Gas Temperature | 18° C. |
| Compressor Efficiency | 70% |

TABLE 4

| Composition | Evap pres, kPa | Cond pres, kPa | Comp exit temp, ° C. | Cond/Evap average temp glide, ° C. | COP | Cap, kJ/m$^3$ | COP rel to HFC-134a | Cap rel to HFC-134a | Suitable as replacement for... |
|---|---|---|---|---|---|---|---|---|---|
| HFC-134a | 337 | 1458 | 85.3 | 0 | 3.016 | 2184 | 100% | 100% | |
| HCFC-22 | 565 | 2128 | 109.6 | 0 | 2.970 | 3402 | 98% | 156% | |
| R-407C | 558 | 2286 | 97.0 | 4.2 | 2.830 | 3302 | 94% | 151% | |
| HFO-1234yf | 359 | 1429 | 73.6 | 0 | 2.876 | 2026 | 95% | 93% | |
| HFO-1234yf/cyclopropane (97/3 wt %) | 379 | 1489 | 75.0 | 0.5 | 2.873 | 2124 | 95% | 97% | HFC-134a |
| HFO-1234yf/cyclopropane (95/5 wt %) | 390 | 1523 | 75.8 | 0.7 | 2.875 | 2182 | 95% | 100% | HFC-134a |
| HFO-1234yf/cyclopropane (90/10 wt %) | 415 | 1590 | 77.6 | 0.8 | 2.887 | 2308 | 96% | 106% | HFC-134a |
| HFO-1234yf/cyclopropane (65.4/34.6 wt %) | 465 | 1683 | 84.9 | 0 | 3.014 | 2642 | 100% | 121% | HCFC-22 or R407C |
| HFO-1234yf/propylene (97/3 wt %) | 388 | 1531 | 75.0 | 1.3 | 2.855 | 2160 | 95% | 99% | HFC-134a |
| HFO-1234yf/propylene (95/5 wt %) | 406 | 1593 | 75.9 | 1.9 | 2.834 | 2239 | 94% | 103% | HFC-134a |
| HFO-1234yf/propylene (90/10 wt %) | 448 | 1728 | 77.7 | 2.7 | 2.801 | 2414 | 93% | 111% | HFC-134a |

TABLE 4-continued

| Composition | Evap pres, kPa | Cond pres, kPa | Comp exit temp, °C | Cond/Evap average temp glide, °C | COP | Cap, kJ/m³ | COP rel to HFC-134a | Cap rel to HFC-134a | Suitable as replacement for... |
|---|---|---|---|---|---|---|---|---|---|
| HFO-1234yf/propylene (23.9/76.1 wt %) | 333 | 2256 | 89.0 | 0 | 2.860 | 3401 | 95% | 156% | HCFC-22 or R407C |
| HFO-1234yf/HFC-152a/cyclopropane (80/17/3 wt %) | 380 | 1503 | 79.3 | 0.4 | 2.934 | 2212 | 97% | 101% | HFC-134a |
| HFO-1234yf/HFC-152a/cyclopropane (50/40/10 wt %) | 399 | 1565 | 87.0 | 1.1 | 3.004 | 2408 | 100% | 110% | HFC-134a |
| HFO-1234yf/HFC-152a (40/40/20 wt %) | 496 | 1928 | 86.2 | 4.3 | 2.911 | 2862 | 97% | 131% | HCFC-22 or R407C |
| HFO-1234yf/HFC-152a/propane (50/25/25 wt %) | 540 | 2025 | 83.2 | 2.5 | 2.815 | 2902 | 93% | 133% | HCFC-22 or R407C |
| HFC-1234yf/HFC-134a/cyclopropane (80/17/3 wt %) | 388 | 1542 | 76.8 | 0.6 | 2.897 | 2222 | 96% | 102% | HFC-134a |
| HFC-1234yf/HFC-134a/cyclopropane (80/10/10 wt %) | 423 | 1626 | 78.6 | 0.9 | 2.896 | 2371 | 96% | 109% | HFC-134a |

It should be noted that all the blends as listed above have higher cooling capacity than pure HFO-1234yf. Additionally, most blends have less glide than R407C (an accepted refrigerant blend used at the present time). Finally, it can be seen that the various blends are potential replacements for HFC-134a, HCFC-22, or R407C as indicated in Table 4.

Example 3

Global Warming Potentials

Values for global warming potential (GWP) for certain disclosed compositions are given in Table 5. The GWP for the pure components are listed for reference. The values for HFCs and hydrocarbons are taken from the "Climate Change 2007—IPCC (Intergovernmental Panel on Climate Change) Fourth Assessment Report on Climate Change", from the section entitled "Working Group 1 Report: "The Physical Science Basis", Chapter 2, pp. 212-215, Tables 2.14 and 2.15. The value for HFO-1234yf and HFO-1234ze were published in Papadimitriou et al., *Physical Chemistry Chemical Physics*, 2007, vol. 9, pp. 1-13. An estimated value for GWP=3 (*) for cyclopropane is used as there is no value listed in the tables referenced herein. Specifically the 100 year time horizon values are used. The GWP values for compositions containing more than one component are calculated as weighted averages of the individual component GWP values.

TABLE 5

| Component or composition | GWP |
|---|---|
| Comparative | |
| HCFC-22 | 1810 |
| HFC-32 | 675 |
| HFC-134a | 1430 |
| HFC-125 | 3500 |
| HFC-227ea | 3220 |
| cyclopropane | 3* |
| propane | 3.3 |
| propylene | 1.8 |
| n-butane | 4 |
| isobutane | 4** |
| dimethyl ether | 1 |
| HFO-1234yf | 4 |
| R404A | 3922 |
| R407C | 1802 |
| R410A | 2088 |
| R417A | 2346 |
| R419A | 2969 |
| R422D | 2729 |
| R423A | 2281 |
| R428A | 3617 |
| R437A | 1806 |
| R438A | 2264 |
| Compositions as disclosed herein | |
| HFO-1234yf/cyclopropane (97/3 wt %) | 4.0 |
| HFO-1234yf/cyclopropane (95/5 wt %) | 4.0 |
| HFO-1234yf/cyclopropane (90/10 wt %) | 3.9 |
| HFO-1234yf/cyclopropane (65.4/34.6 wt %) | 3.7 |
| HFO-1234yf/propylene (97/3 wt %) | 3.9 |
| HFO-1234yf/propylene (95/5 wt %) | 3.9 |
| HFO-1234yf/propylene (90/10 wt %) | 3.8 |
| HFO-1234yf/propylene (23.9/76.1 wt %) | 2.3 |
| HFO-1234yf/HFC-152a/cyclopropane (80/17/3 wt %) | 24 |
| HFO-1234yf/HFC-152a/cyclopropane (50/40/10 wt %) | 52 |
| HFO-1234yf/HFC-152a/cyclopropane (52.6/11.1/36.3 wt %) | 17 |
| HFO-1234yf/HFC-152a/propane (40/40/20 wt %) | 52 |
| HFO-1234yf/HFC-152a/propane (50/25/25 wt %) | 34 |
| HFO-1234yf/HFC-152a/propane (18.2/27.5/54.3 wt %) | 38 |
| HFO-1234yf/HFC-134a/cyclopropane (80/17/3 wt %) | 246 |
| HFO-1234yf/HFC-134a/cyclopropane (80/10/10 wt %) | 147 |

*estimated GWP value for cyclopropane.
**estimated GWP value for isobutane based on value for n-butane.

The GWP values for the compositions as disclosed herein listed above are lower than those for HFC-134a and HCFC-22 as well as the currently used refrigerant blends, R404A, R407C, R410A, and others as listed in the table above.

What is claimed is:
1. A composition comprising a combination of refrigerants consisting of about 65.4 weight percent HFO-1234yf, and about 34.6 weight percent cyclopropane which is azeotropic at 25° C. and about 123.8 psia.

2. The composition of claim 1, further comprising at least one lubricant selected from the group consisting of mineral oils, alkylbenzenes, polyalphaolefins, polyalkylene glycols, polyol esters, polyvinyl ethers, and mixtures thereof.

3. A method for replacing R22 in a system that uses, used or was designed to use R22 comprising providing a composition of claim 1 to said system.

4. A process to produce cooling comprising condensing a composition of claim 1 and thereafter evaporating said composition in the vicinity of a body to be cooled.

5. A process to produce heat comprising condensing the composition of claim 1 in the vicinity of a body to be heated and thereafter evaporating said composition.

* * * * *